United States Patent [19]

Gee

[11] Patent Number: 5,505,112

[45] Date of Patent: Apr. 9, 1996

[54] CHURNING LOSS REDUCTION MEANS FOR GEAR TYPE DEVICES

[75] Inventor: Thomas A. Gee, Allen Park, Mich.

[73] Assignee: Eaton Corporation, Cleveland, Ohio

[21] Appl. No.: 199,381

[22] Filed: Feb. 18, 1994

[51] Int. Cl.⁶ ................................................. F16H 57/02
[52] U.S. Cl. ........................... 74/606 R; 74/467; 74/468; 184/6.12; 180/339
[58] Field of Search .................................. 74/606 R, 467, 74/468; 184/6.12, 11.1; 180/339

[56] References Cited

U.S. PATENT DOCUMENTS

| | | | |
|---|---|---|---|
| 3,625,310 | 12/1971 | Herrick | 184/6.12 |
| 3,777,849 | 12/1973 | Piret | 184/6.12 |
| 4,414,861 | 11/1983 | Witt | 74/606 A |
| 4,420,990 | 12/1983 | Hauser | 74/606 R |
| 4,693,133 | 9/1987 | Tomita et al. | 184/6.12 X |
| 4,766,773 | 8/1988 | Yamaguchi et al. | 184/6.12 |
| 4,989,706 | 2/1991 | Morscheck | 192/53 E |
| 5,035,155 | 7/1991 | Robledo | 74/467 |
| 5,092,196 | 3/1992 | Kameda et al. | 74/606 R |
| 5,098,355 | 3/1992 | Long | 475/220 |
| 5,161,644 | 11/1992 | Swenskowski et al. | 180/339 X |
| 5,316,106 | 5/1994 | Baedke et al. | 74/606 R X |

FOREIGN PATENT DOCUMENTS

| | | | |
|---|---|---|---|
| 4-140550 | 5/1992 | Japan | 184/6.12 |
| 4-285356 | 10/1992 | Japan | 184/6.12 |
| 499426 | 3/1976 | U.S.S.R. | 184/6.12 |
| 983361 | 12/1982 | U.S.S.R. | 184/6.12 |
| 1670270 | 8/1991 | U.S.S.R. | 184/6.12 |
| 634971 | 3/1950 | United Kingdom | 184/6.2 |

*Primary Examiner*—Vinh T. Luong
*Attorney, Agent, or Firm*—L. J. Kasper; Howard D. Gordon

[57] ABSTRACT

A gear device such as a change gear transmission of the countershaft (21) type in which, mounted for rotation about the countershaft is a larger gear (17) and a smaller gear (29). The transmission housing (11) defines a first lubricant reservoir (R1), having a nominal fill level (L1), which is able to lubricate the smaller gear as it rotates. A partition member (51) is disposed around the larger gear and defines a second lubricant reservoir (R2) through which the larger gear passes as it rotates. The partition member defines fluid passages (71,73) providing restricted communication from the first reservoir to the second reservoir. The fluid passages (71,73) are sized such that as the larger gear rotates, carrying lubricant out of the second reservoir (R2), there is maintained in the second reservoir a second fill level (L2), below the first fill level (L1) such that at least a portion of the teeth of the larger gear (17) pass just below the second fill level as the larger gear rotates. The result is substantially reduced churning losses, without decreasing the ability to lubricate the smaller gears.

4 Claims, 3 Drawing Sheets

CHURNING LOSS REDUCTION MEANS FOR GEAR TYPE DEVICES

BACKGROUND OF THE DISCLOSURE

The present invention relates to gear-type devices, such as transmissions and axle assemblies, which include at least one, but typically, a plurality of gears rotatable about an axis of rotation of a shaft.

In many types of gear devices, in which the gears mounted about a shaft are in meshing engagement with other gears, it is necessary to provide some sort of lubricant fluid to lubricate the gear mesh. The lubricant fluid minimizes the generation of wear particles, and dissipates frictional heat generated in the gear mesh. In many such gear devices, the housing which surrounds the gears acts both as a reservoir for lubricant fluid, and as a heat transfer surface, and accordingly, it has been common practice to put enough lubricant within the housing so that each gear rotating about the shaft will be rotated through the fluid lubricant, and pick up some of the lubricant on the teeth of the gear, where some of it remains until those particular teeth come into meshing engagement with the teeth of a mating gear.

Although providing sufficient lubricant in the reservoir, such that the teeth of each gear along the shaft will pass just below the fill level of the lubricant, has proven to be generally satisfactory, in terms of the ability to lubricate, there are certain disadvantages to the arrangement described.

By way of example only, in a typical multi-forward-speed, change gear transmission of the countershaft type, there is typically a mainshaft and two countershafts, an "upper" countershaft and a "lower" countershaft. On each countershaft, there are anywhere from perhaps four countershaft gears to as many as perhaps seven countershaft gears disposed axially along the countershaft. In such a device, each countershaft gear is associated with a different speed ratio, and therefore, each gear has a substantially different diameter. The use of the typical lubrication method, described above, requires that the lubricant level in the transmission housing be high enough for the teeth of the smallest diameter gear to pass through the lubricant, as the gear rotates.

The disadvantage of such an arrangement is that the largest gear on the countershaft, and perhaps the largest two or three gears on the countershaft, rotate through lubricant which is much deeper than is truly needed, merely to lubricate the teeth of those particular gears. In fact, it has been determined that the teeth of those larger gears, whose teeth have the greater linear velocity, rotating through a fairly deep reservoir of lubricant fluid, can result in substantial "churning losses", i.e., transmission horsepower which is consumed, and therefore lost, in turning the countershaft, and merely overcoming the resistance offered, by the lubricant, to the rotation of the gears.

It has been found that there are actually some benefits to slightly "overfilling" the transmission housing with lubricant fluid. Such overfilling provides a "margin of error" which permits operation of the vehicle on a grade, or permits a non-level mounting angle for the transmission. Also, overfilling with lubricant provides some allowance for leakage of fluid during operation. However, overfilling also has the effect of further increasing the "churning losses" discussed above, and therefore, in spite of the potential benefits of overfilling, it has not been common to do so because of the overall decrease in transmission efficiency which would result from the increased churning losses.

SUMMARY OF THE INVENTION

Accordingly, it is an object of the present invention to provide an improved gear device of the type including a relatively smaller gear and a relatively larger gear, both of which need to be lubricated, wherein sufficient lubrication is provided for the smaller gear, but churning losses involving the larger gear may be substantially reduced.

It is a further object of the present invention to provide an improved gear device in which it is possible to overfill the fluid lubricant without thereby increasing gear churning losses.

It is a related object of the present invention to provide an improved gear device which may be operated on a grade, over an extended period of time, in which fluid lubricant is still provided to all of the gear meshes.

It is a more specific object of the present invention to provide an improved gear device which accomplishes the above-stated objects while, at the same time, making it possible to check the fluid lubricant level when the gear device is in a static (at rest) condition.

The above and other objects of the invention are accomplished by the provision of an improved gear device of the type including housing means defining an axis of rotation, shaft means disposed on the axis of rotation, and a relatively smaller member, and a relatively larger gear, both the gear and the member being disposed about the shaft means for rotation about the axis of rotation. The housing means includes a lower, reservoir-defining portion operable, when full of fluid, to define a first lubricant fluid reservoir, defining a nominal fill level such that the relatively smaller member is able to be lubricated by fluid in the first fluid reservoir as the relatively smaller member rotates about the axis of rotation.

The improved gear device is characterized by partition means disposed within the reservoir-defining portion of the housing means, and operable to define a second lubricant fluid reservoir through which the relatively larger gear passes, as the larger gear rotates about the axis of rotation. The partition means defines fluid passage means providing restricted fluid communication from the first lubricant reservoir to the second lubricant reservoir. The fluid passage means is sized such that, as the relatively larger gear rotates, carrying lubricant fluid from the second reservoir, the restricted fluid communication maintains the second lubricant reservoir at substantially a second fill level, below the first fill level, such that at least a portion of the teeth of the relatively larger gear pass just below the second fill level as the larger gear rotates about the axis of rotation.

DESCRIPTION OF THE PREFERRED EMBODIMENTS

Figure 1:
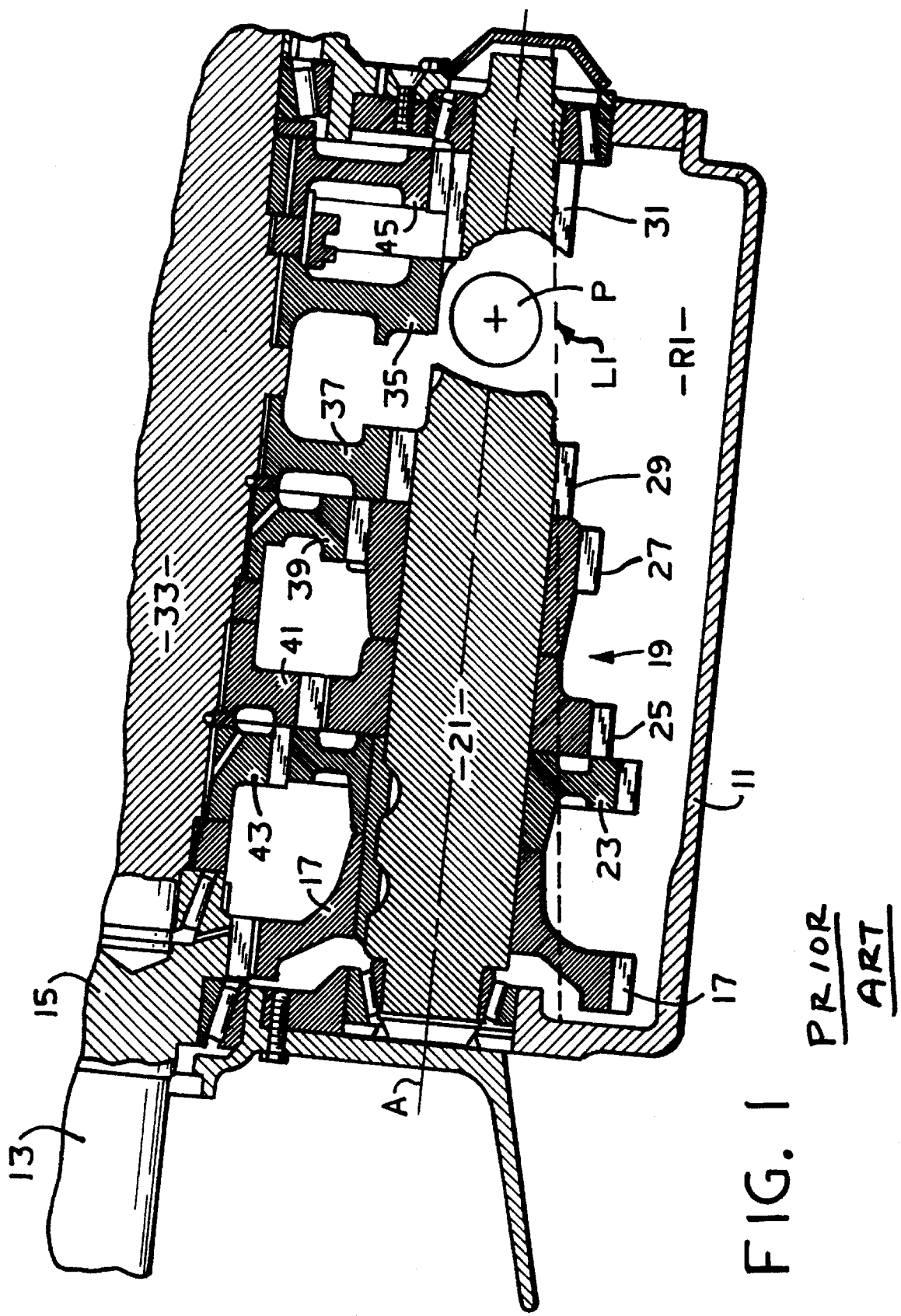
FIG. 1 is a fragmentary, axial cross-section of a typical vehicle change gear transmission of the type with which the present invention may be utilized.
Figure 2:
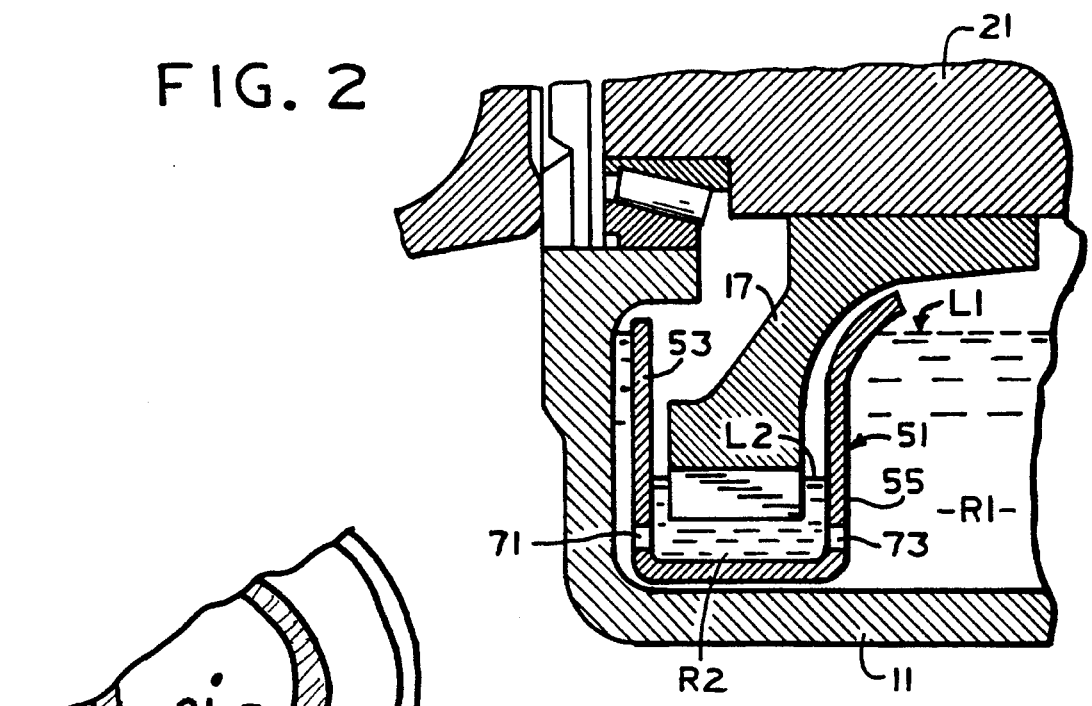
FIG. 2 is a fragmentary, enlarged axial cross-section, similar to FIG. 1, including the present invention.

In the following description of the preferred embodiments, certain terms will be used for convenience and reference only, and are not intended to be limiting. Terms such as "upwardly", "downwardly", "rightwardly", and "leftwardly" will designate directions in the drawings to which references are being made. Terms such as "forward" and "rearward" will refer, respectively, to the front and rear ends of the transmission as conventionally mounted in the vehicle, being, respectively, to the left and right of the transmission, as illustrated in FIGS. 1 and 2. Terms such as "inwardly" and "outwardly" will refer to directions towards and away from, respectively, the geometric center of the device and designated parts thereof. The term "below", which will be used hereinafter in regard to fluid fill levels, will be used in its normal sense, i.e., that fluid will naturally flow from a first location to a second location which is "below" the first location. The above applies to the words specifically mentioned above, as well as derivatives thereof and similar terms.

Referring now to FIG. 1, which is not intended to limit the invention, there is illustrated a six forward-speed, single reverse-speed, manually-shifted change gear transmission of well-known design. The overall configuration, design, and operation of the transmission may be better understood by reference to U.S. Pat. No. 4,989,706, assigned to the assignee of the present invention and incorporated herein by reference. The transmission, shown only fragmentarily herein, is disposed within a housing 11, and includes an input shaft 13 driven by a prime mover (not shown herein) such as a well-known diesel engine, through a normally engaged, selectively disengaged master friction clutch (also not shown).

The input shaft 13 carries an input gear 15, which is constantly meshed with a countershaft gear 17 for providing input drive torque to a countershaft assembly 19. The countershaft assembly 19 includes a countershaft 21 and countershaft gears 17, 23, 25, 27, 29, and 31, all of which are fixed for rotation with the countershaft 21. As is well known to those skilled in the art, churning losses are a function of the linear speed of the teeth on a particular gear. Thus, although the countershaft gears 17, 23, 25, 27, 29 and 31 all rotate at the same speed, in revolutions per minute, the teeth on the gear 17 have the greatest linear speed, because the gear 17 has the largest diameter. As is shown schematically in FIG. 3, the input gear 15 is also in engagement with a countershaft gear 17a, mounted on an upper countershaft 21a.

A main shaft or output shaft 33 is rotatably supported in the housing 11 and has a plurality of ratio gears rotatably supported thereby and selectively clutchable one at a time to the output shaft 33, as is well known in the art. A first speed ratio gear 35 is constantly meshed with countershaft gear 31, a second speed ratio gear 37 is constantly meshed with countershaft gear 29, a third speed ratio gear 39 is constantly meshed with countershaft gear 27, a fourth speed ratio gear 41 is constantly meshed with countershaft gear 25, and a fifth speed ratio gear 43 is constantly meshed with countershaft gear 23. Sixth speed or high speed is obtained by clutching the output shaft 33 directly to the input gear 15 for a direct drive connection therebetween. Reverse operation is obtained by clutching a reverse ratio gear 45 to the output shaft 33. Churning losses are a concern on devices such as the transmission shown in FIG. 1 because, as long as the vehicle engine is running, and the clutch is engaged, the input shaft 13 and the input gear 15 are rotating, and therefore the countershaft 21 and countershaft gear 17 are also rotating. Thus, the churning losses are occurring continuously, regardless of the speed ratio which has been selected by the vehicle operator.

As is described in greater detail in above-incorporated U.S. Pat. No. 4,989,706, a manually operated shift lever (not shown herein) engages and disengages a series of jaw clutch assemblies (also not shown herein) which are associated with the various first through fifth speed ratio gears 35 through 43. The structure, function, and operation of jaw clutches is well known in the prior art, and thus will not be described further herein.

Referring still primarily to FIG. 1, it may be seen that the countershaft 21 defines an axis of rotation A, which in the subject embodiment, is substantially parallel to the axis of rotation of the input shaft 13 and the output shaft 33. In a typical vehicle installation of a transmission of the type shown in FIG. 1, the transmission is oriented with the axis of rotation A defining a downward angle of approximately five degrees, relative to a horizontal plane. As a result, the lower portion of the housing 11 defines a lubricant fluid reservoir R1, having a nominal fluid fill level L1. It should be noted in FIG. 1 that the countershaft 21 is broken away in one area to permit a schematic illustration of a fluid fill plug P. As is well known to those skilled in the art, the bottom of the fill plug P determines the nominal fill level L1. As was mentioned in the background of the disclosure, it is one object of the invention to be able to "overfill" the lubricant reservoir R1, thus improving lubrication, but without increasing the churning losses. Accordingly, the fill plug P and the nominal fluid fill level L1 are shown somewhat higher in FIG. 1 than would otherwise be the case, without the present invention.

As may best be seen in FIG. 1, as the countershaft assembly 19 rotates, the teeth of the countershaft gears 23, 25, 27, 29, and 31 are disposed just slightly below (i.e., the teeth pass just below) the nominal fluid fill level L1. However, the countershaft gear 17, because it is the largest diameter gear of the countershaft assembly 19, extends further below the fill level L1. As a result, and because of the greater linear speed of the teeth, the rotation of the countershaft gear 17 in lubricant fluid results in "churning losses", i.e., horsepower is consumed in rotating the gear through the fluid (more so than rotating the gear in air), and the loss is manifested as heat generated in the fluid. For lubrication purposes, only the teeth of the gear need to extend below the fluid level of the lubricant, thus "picking up" some of the lubricant in preparation for meshing engagement with a mating gear. As is well known to those skilled in the art, some of the fluid on the teeth of each gear is slung outward against the relatively cooler walls of the housing 11, such that the walls act as a heat transfer surface, while the remainder of the fluid is retained on the teeth for purposes of lubrication.

Figure 3:
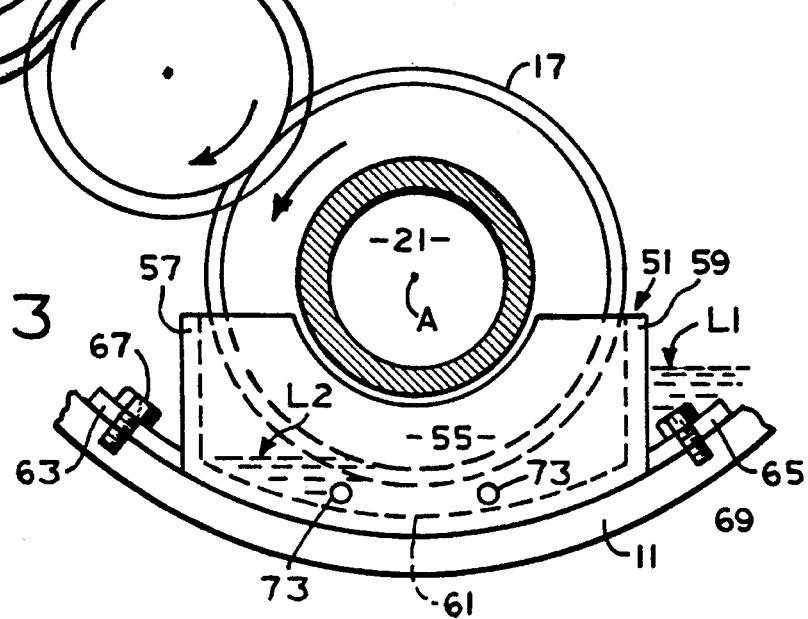
FIG. 3 is a somewhat schematic, transverse view, illustrating the present invention.

Referring now primarily to FIGS. 2 and 3, the means provided by the present invention for reducing churning losses will be described in some detail. Disposed adjacent the forward portion of the housing 11 is a reservoir member (partition means), generally designated 51. In the subject embodiment, the reservoir member 51 comprises a generally trough-shaped, stamped or molded member, including forward and rearward transverse walls 53 and 55, respectively. Each of the transverse walls 53 and 55 preferably defines a generally half-circular cut-out portion to accommodate the shaft upon which the respective gear rotates or, as shown in FIG. 2, an annular portion of the countershaft gear 17 which surrounds the countershaft 21. The reservoir member 51 further includes a pair of endwalls 57 and 59, which interconnect the transverse walls 53 and 55, and are "shown" only in FIG. 3.

The reservoir member 51 further includes a bottom portion 61 (although it is not essential to the operation to have such a bottom portion), which includes a pair of tab portions 63 and 65.. The tab portions 63 and 65 extend transversely beyond the endwalls 57 and 59. By means of a pair of bolts 67 and 69, which extend through the tab portions 63 and 65, respectively, the reservoir member 51 is attached to the interior surface of the housing 11. The means for attaching the reservoir member 51 could also be disposed within the member 51, rather than external thereto as in FIG. 1. It is important that the reservoir member 51 not be able to move forwardly or rearwardly relative to the countershaft gear 17, or move transversely, i.e., left or right in FIG. 3, because the result would likely be engagement of the member 51 with the teeth of the gear 17, causing damage to either the member or the gear, or both.

As may best be seen in FIG. 2, the nominal (dynamic) fluid fill level L1 in the lubricant fluid reservoir R1 is preferably at or below the level of the half-circular cut-out in the forward and rearward transverse walls 53 and 55 (see FIG. 3). However, even if the fill level L1 is above the cut-out in the wall, the "weir" effect of the clearance between the cut-out and the gear restricts flow into the reservoir member 51. The reservoir member 51 forms a partition within the fluid lubricant reservoir R1, and defines a second lubricant fluid reservoir R2 through which the countershaft gear 17 rotates. In accordance with one object of the invention, inside the second lubricant reservoir R2, the fluid is at a fill level L2, which is substantially below (lower than) the nominal fluid fill level L1. Preferably, the fill level L2 is maintained such that the teeth of the gear 17 pass just below the fill level L2, as the gear 17 rotates, thus substantially reducing the churning losses associated with the rotation of the countershaft gear 17.

In order to accomplish the objective of the invention, the forward and rearward transverse walls 53 and 55 define a plurality of bleed holes 71 and 73, respectively. As will be understood by those skilled in the art, while the countershaft gear 17 rotates through the fluid reservoir R2, the gear 17 "picks up" and carries away a certain amount of the lubricant from the reservoir R2, the amount of the lubricant removed from the reservoir R2 being somewhat proportional to the speed of rotation of the gear 17. Thus, in accordance with one aspect of the present invention, the bleed holes 71 and 73 need to be sized to permit just enough fluid to flow from the reservoir R1, through the bleed holes 71 and 73, into the reservoir R2 to maintain the desired fill level L2. As will also be apparent to those skilled in the art, the rate of flow from the reservoir R1 through the bleed holes 71 and 73 will be related to the "pressure head", i.e., the height difference between the fill level L1 and the fill level L2. The rate of flow is also related to factors such as the temperature and the fluid viscosity.

Therefore, the arrangement of the present invention will be somewhat "self-compensating", i.e., as more fluid is removed from the reservoir R2 by the gear 17, the fill level L1 will rise, and the fill level L2 will go down, thus increasing the pressure head, tending to increase the flow through the bleed holes 71 and 73. Conversely, if less fluid is removed from the reservoir R2 as the gear 17 rotates, the fill level L2 will tend to increase, thus reducing the pressure head, and decreasing the rate of flow through the bleed holes 71 and 73. Similarly, the arrangement of the present invention is "self-compensating" with regard to both temperature and viscosity of the fluid. As the temperature increases or the viscosity is reduced, the rate of flow into the reservoir R2 will increase, thus increasing the amount of fluid slung out by the gear 17. As more fluid is slung by the gear 17 onto the walls of the housing 11, more heat is transferred, thus cooling the fluid.

Although in FIG. 2 only a single reservoir member 51 is shown, it would probably be desirable to utilize a similar reservoir member disposed about the countershaft gears 23 and 25, which also extend a substantial distance below the nominal fill level L1. It is one important aspect of the present invention that each gear, in a device such as the transmission shown in FIG. 1, may have its own separate reservoir member in which the bleed holes 71 and 73 may be sized and located in a way which is unique for that particular gear diameter, speed of rotation, etc. It should be noted that the bleed holes 71 and 73 would preferably be sized to maintain a desired fill level L2 within the reservoir R2 when the gear 17 is rotating at the highest speed at which it would normally rotate, during normal operation. As noted previously, the higher the speed of rotation of the gear 17, the higher the churning losses. Then, at slower speeds of rotation of the gear 17 the fill level L2 may rise somewhat, but with the gear 17 rotating slower, the churning losses would still be about the same.

All of the discussion up to this point has related to fill levels when the transmission is operating. However, it is also an object of the invention to be able to reduce churning losses, and facilitate some lubricant overfill, while still being able to check the fluid level of the lubricant (and determine whether or not it is sufficient) when the transmission is not operating, i.e., under "static" rather than dynamic conditions. During a static condition, with no lubricant being removed from the reservoir R2 by rotation of the gear 17, the fluid levels in reservoirs R1 and R2 will reach an equilibrium stage, i.e., the fluid levels will be the same in both reservoirs. Obviously, this requires a fill level in the reservoir R1 which is somewhat below the fill level L1, while requiring a fill level in the reservoir R2 which is substantially above the fill level L2. However, it is one important aspect of the present invention that the reservoir member 51 achieves the various objects discussed previously, but does not interfere with the ability to accurately assess the lubricant fill level when the transmission is at rest (static conditions).

Preferably, the reservoir member 51 should be a member which can be attached to the housing 11 (rather than being formed integrally therewith) because a certain number of transmission may utilize one particular set of gears, while certain other transmissions, utilizing the same housing, etc., may include a different set of gears. As noted previously, if the gear 17 were replaced by another countershaft gear having a different diameter, it is likely that the reservoir member 51 would be replaced by a different reservoir member in which the bleed holes would be sized and/or located differently.

Alternative Embodiment

Figure 4:
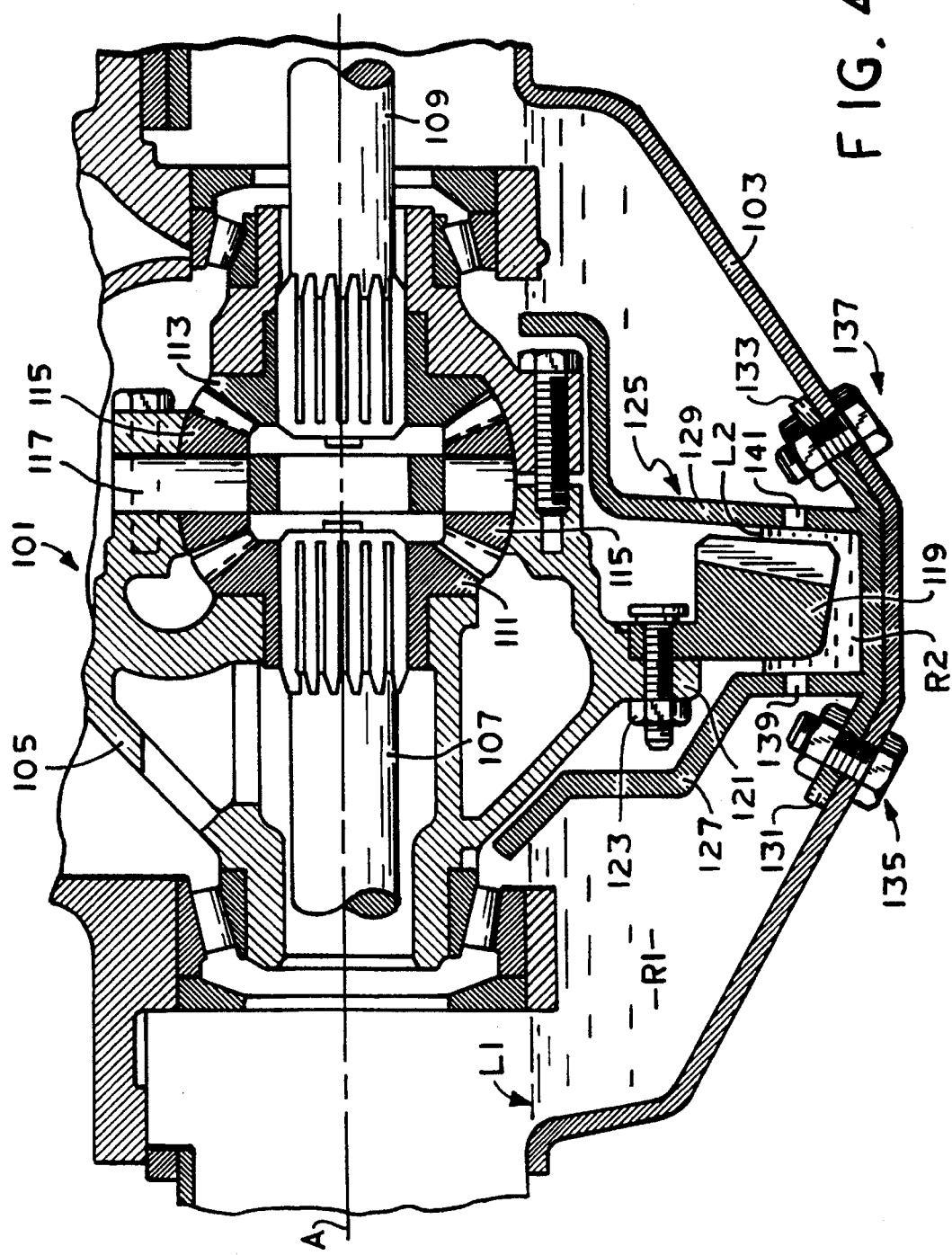
FIG. 4 is an axial cross-section of an alternative embodiment of the present invention.

Referring now to FIG. 4, there is illustrated an alternative embodiment of the present invention, in which the various elements bear reference numerals in excess of "100". However, fluid reservoirs and fill levels will bear the same references as in the primary embodiment.

In FIG. 4, there is illustrated a fairly simple form of a rear wheel drive, interwheel differential assembly, generally designated 101. The differential assembly 101 includes a housing 103, and rotatably supported therein is a differential case 105. Disposed within the case 105, and rotatable about an axis of rotation A, are left and right axle shafts 107 and 109, respectively. The axle shafts 107 and 109 are in splined engagement with a pair of side gears 111 and 113, respectively, which, in turn, are in meshing engagement with a pair of pinion gears 115. The pinion gears 115 are rotatably mounted on, and supported by, a pinion shaft 117, which, preferably, is retained relative to the differential case 105.

Differential assemblies of the type shown in FIG. 4 are now quite well known to those skilled in the art, and are illustrated and described in somewhat greater detail in U.S. Pat. No. 5,098,355, assigned to the assignee of the present invention, and incorporated herein by reference. Typically, the input to the differential assembly 101 is by means of an input pinion gear (not shown herein) mounted on a driveshaft or propshaft (also not shown herein). The input pinion gear is in meshing engagement with an annular ring gear 119, which is attached to a flange portion 121 of the differential case 105 by any suitable means, such as a plurality of nut and bolt assemblies 123.

As is well known to those skilled in the differential art, the lower part of the housing 103 defines a lubricant fluid reservoir R1 (fluid being shown only on the left side of FIG. 4), having the nominal fluid fill level L1. As is also well known to those skilled in the art, the fill level L1 must be high enough so that some portion of the differential case 105, or some structure associated therewith and rotating therewith, is able to engage the lubricant in the reservoir R1 and "sling" the lubricant or in some other manner pick up the lubricant, and transmit it so that it is able to lubricate the mesh of the side gears 111 and 113 with the pinion gears 115. Typically, in the differential assembly 101, there would be bearing sets (not shown in FIG. 4) supporting the axle shafts 107 and 109 at the outboard end thereof, and it may be required for the fill level L1 to be high enough to lubricate those bearing sets.

Therefore, as is also well known to those skilled in the art, the rotation of the large ring gear 119 through the large amount of fluid in the reservoir R1 can result in a substantial amount of churning loss, even though the ring gear 119 in a typical differential assembly 101 is not rotating at as high a speed of rotation as would the countershaft gear 17 in the main embodiment. In one commercial differential assembly, embodied in a truck axle sold by the assignee of the present invention, it has been estimated that, at typical highway speeds, the horsepower loss resulting from just the churning loss of the ring gear 119 would be in the range of about six horsepower.

Referring still to FIG. 4, disposed at the lowest portion of the housing 103 is a reservoir member 125, the general function of which is the same as the reservoir member 51 in the main embodiment, and the general construction thereof may be quite similar to that of the reservoir member 51. The reservoir member 125 comprises left and right sidewalls 127 and 129, respectively. Formed integrally with the reservoir member 125 is a pair of tab portions 131 and 133 which, by means of a pair of nut and bolt assemblies 135 and 137, respectively, are fixed securely to the housing 103.

In general, the lower portion of the reservoir member 125 will conform to the housing 103 (and be just beyond the outside diameter of the ring gear 19), while the radially inwardmost portion of the reservoir member 125 will conform generally to the adjacent surface of the differential case 105, as may be seen in FIG. 4. The reservoir member 125 defines a second lubricant fluid reservoir R2 through which the ring gear 119 rotates. Inside the second lubricant reservoir R2, the fluid is at a fill level L2, which is substantially below the nominal fluid fill level L1. Preferably, the fill level L2 is maintained such that the teeth of the ring gear 119 (or at least a portion of the teeth) pass just below the fill level L2 as the ring gear 119 rotates. It will be understood by those skilled in the art that after the teeth of the ring gear pass partially through the lubricant in the reservoir R2, the continued rotation of the ring gear 119 will result in the lubricant flowing along the teeth, thereby lubricating the entire surface of the tooth before the tooth comes into meshing engagement with the tooth of the drive pinion.

The sidewalls 127 and 129 of the reservoir member 125 define bleed holes 139 and 141, respectively, which, preferably, are disposed somewhat below the fill level L2. The bleed holes 139 and 1 41 perform in much the same manner as the bleed holes 71 and 73; i.e., they control the flow of fluid from the fluid reservoir R1 into the second fluid reservoir R2, maintaining the desired fill level L2, even as fluid is removed from the reservoir R2 by the rotation of the ring gear 119.

In regard to the embodiment shown in FIG. 4, reference hereinafter in the claims to a "relatively larger gear" will refer to the ring gear 119, while reference to the "relatively smaller member" could refer to the bearing supporting the axle shafts 107 and 109, or could refer to the side gears 111 and 113, or to any other member which rotates about the axis of rotation A, and which requires lubrication, and for which the height of the fill level L1 is significant. Thus, it may be seen that the differential assembly 101 of the embodiment of FIG. 4 represents a broader application of the present invention than does the transmission and countershaft gear arrangement shown in FIGS. 1–3.

The invention has been described in great detail in the foregoing specification, and it is believed that various alterations and modifications of the invention will become apparent to those skilled in the art from a reading and understanding of the specification. It is intended that all such alterations and modifications are included in the invention, insofar as they come within the scope of the appended claims.

I claim:

1. In a gear type device of the type including housing means defining an axis of rotation, shaft means disposed on said axis of rotation; a first, relatively smaller gear and a second, relatively larger gear, both of said first and second gears being disposed about said shaft means for rotation about said axis of rotation and each of said gears including an array of teeth; said housing means including a lower, reservoir-defining portion operable, when full of fluid, to define a first lubricant fluid reservoir, defining a nominal fill level, such that the teeth of said first, relatively smaller gear pass just below said nominal fill level of fluid in said first reservoir as said first gear rotates about said axis of rotation (A); said gear device comprising a change gear mechanical transmission including a first, lower countershaft, and a second, upper countershaft, said shaft means comprising said first, lower countershaft; characterized by:

(a) partition means disposed within said lower, reservoir-defining portion of said housing means, and operable to define a second lubricant fluid reservoir through which said second, relatively larger gear passes as said second gear rotates about said axis of rotation;

(b) said partition means defining fluid passage means providing restricted fluid communication from said first lubricant reservoir to said second lubricant reservoir; and (c) said fluid passage means being sized such that, as said second gear rotates carrying lubricant fluid from said second lubricant reservoir, said restricted fluid communication maintains said second lubricant reservoir at a second fill level, lower than said nominal fill level, such that at least a portion of the teeth of said second, relatively larger gear pass just below said second fill level as said second gear rotates about said axis of rotation.

2. A gear device as claimed in claim 1, characterized by the teeth of said first, relatively smaller gear passing just below said nominal fill level of fluid in said first reservoir, as said first gear rotates about said axis of rotation.

3. In a gear type device of the type including housing means defining an axis of rotation, shaft means disposed on said axis of rotation; a first, relatively smaller gear and a second, relatively larger gear, both of said first and second gears being disposed about said shaft means for rotation about said axis of rotation and each of said gears including an array of teeth; said housing means including a lower, reservoir-defining portion operable, when full of fluid, to define a first lubricant fluid reservoir, defining a nominal fill level, such that the teeth of said first, relatively smaller gear pass just below said nominal fill level of fluid in said first reservoir as said first gear rotates about said axis of rotation (A); said axis of rotation of said gear device defining a downward angle relative to a horizontal plane, said second relatively larger gear being disposed forwardly, and upwardly, from said first, relatively smaller gear; characterized by:

(a) partition means disposed within said lower, reservoir-defining portion of said housing means, and operable to define a second lubricant fluid reservoir through which said second, relatively larger gear passes as said second gear rotates about said axis of rotation;

(b) said partition means defining fluid passage means providing restricted fluid communication from said first lubricant reservoir to said second lubricant reservoir; and (c) said fluid passage means being sized such that, as said second gear rotates carrying lubricant fluid from second lubricant reservoir, said restricted fluid communication maintains said second lubricant reservoir at a second fill level, lower than said nominal fill level, such that at least a portion of the teeth of said second, relatively larger gear pass just below said second fill level as said second gear rotates about said axis of rotation.

4. A gear device as claimed in claim 3, characterized by the teeth of said first, relatively smaller gear passing just below said nominal fill level of fluid in said first reservoir, as said first gear rotates about said axis of rotation.

* * * * *